Patented May 31, 1949

2,471,647

UNITED STATES PATENT OFFICE 2,471,647

ISOMERIZATION OF OLEFINS IN THE PRESENCE OF HYDROGEN FLUORIDE IMPREGNATED ALUMINA

Alex G. Oblad and Joseph U. Messenger, Dallas, Tex., assignors, by mesne assignments, to Socony-Vacuum Oil Company, Incorporated, New York, N. Y., a corporation of New York No Drawing. Application March 4, 1946, Serial No. 651,990

3 Claims. (Cl. 260—683.2)

This invention relates to a process for the catalytic isomerization of olefinic hydrocarbons. More specifically, this invention is concerned with the vapor phase isomerization of straight chain α-olefins herein designated as 1-olefins or mixtures of straight chain α-olefins and straight chain β-olefins, herein designated as 2-olefins. In particular, the invention is concerned with the conversion of such mono-olefins as 1- and 2-butenes, 1- and 2-pentenes, and 1- and 2-hexenes to isomers, the ethylenic carbon atoms of which are more centrally located in the hydrocarbon molecule than the ethylenic carbon atoms of the olefinic components of the feed to the process.

The term ethylenic carbon atoms refers to the two carbon atoms which are joined by the olefinic double bond in the molecule. In the 1-olefin molecule, one of the terminal carbon atoms is one of the ethylenic carbon atoms. The degree of central location of the ethylenic carbon atoms is defined by the number of carbon atoms in a straight chain of an alkyl group linked to an ethylenic carbon atom. The greater the number of carbon atoms in an alkyl group attached to an ethylenic carbon atom of an olefin having a given number of carbon atoms per molecule the less centrally located are the ethylenic carbon atoms of the olefin. According to this concept the ethylenic carbon atoms of straight chain 2-olefins and branched chain 1-, 2-, and 3-olefins are more centrally located than are the ethylenic carbon atoms of the straight chain 1-olefin isomers thereof. Thus, the ethylenic carbon atoms of 2-butene and isobutene are more centrally located han are the ethylenic carbon atoms of 1-butene since in a molecule of the latter, two carbon atoms in a straight chain of an alkyl group are linked to an ethylenic carbon atom while in the 2-butene and isobutene the maximum number of carbon atoms in a carbon atom chain of an alkyl group linked to an ethylenic carbon atom is 1. Likewise, the ethylenic carbon atoms of 2-pentene, one of which has linked thereto an alkyl group having a straight chain of two carbon atoms, are more centrally located than the ethylenic carbon atoms of 1-pentene, one of which has an alkyl group of three carbon atoms in a straight chain linked to one of the ethylenic carbon atoms. On the other hand, the ethylenic carbon atoms of 2-pentene are less centrally located than the ethylenic carbon atoms of trimethylethylene which have attached thereto alkyl groups having a maximum of one carbon atom in an alkyl group.

Various catalysts have been suggested for the isomerization of olefins. Thus, such catalysts as alumina in combination with other oxides, such as silicon dioxide, boron oxide, thoria, and zirconia have been suggested as being particularly effective in converting the less valuable olefins to the more highly branched olefins. It has also been suggested to isomerize olefins in the presence of a catalyst consisting of a minor amount of alumina and a major amount of a mineral acid such as phosphoric acid or sulfuric acid. The above oxide catalysts are generally polymerization catalysts and hence large amounts of polymer are formed in the isomerization process. These catalysts usually require long contact times and hence processes which utilize the less active catalysts involve large investment in equipment to isomerize the olefin. The use of sulfuric acid with alumina at sufficiently high temperatures to isomerize at space velocities sufficiently high to prevent polymerization results in the production of mercaptans. Although phosphoric acid with alumina exhibits high initial activity for the isomerization of olefins, the activity of the catalyst is difficult to maintain.

The primary object of this invention is to isomerize olefins containing from 4 to 6 carbon atoms per molecule. Another object of the invention is to catalytically isomerize olefins under conditions of temperature, pressure, and contact time such that not more than 10 per cent of said olefins is converted to lower molecular weight hydrocarbons and/or higher molecular weight hydrocarbons, as for example, by cracking and/or polymerization. Still another object of the invention is to catalytically isomerize a highly olefinic light naphtha cut such as a light naphtha cut from Fischer-Tropsch synthetic hydrocarbon product containing pentenes and hexenes to an equilibrium mixture containing high percentages of branched chain olefins. A further object of the invention is to isomerize feed material comprising straight chain olefins having not more than six carbon atoms per molecule to isomeric olefins in which the ethylenic carbon atoms are more centrally located in the molecules than in the molecules of olefins of said feed. A particular object of the invention is to convert 1- and/or 2-pentenes to equilibrium mixtures of pentenes containing relatively high percentages of branched pentenes. Other objects of the invention will appear hereinafter.

The process of the invention comprises contacting the olefins to be isomerized with a solid catalyst consisting essentially of alumina which has been treated with hydrofluoric acid. We have found that an alumina type catalyst which has been so treated has much greater activity for isomerizing olefins than an alumina which has not been treated and has activity greater than an alumina which has been treated with such acids as acetic acid or phosphoric acid. We have also found that the hydrofluoric acid-treated alumina catalyst can be used at relatively high temperatures for the isomerization of olefins such as 1-pentene to obtain high conversion to 2-pentene and branched chain pentenes without substantial cracking. A relatively small amount of the pentenes are converted to polymer.

We operate our process under conditions such that less than 10 per cent of the olefin feed is lost as a result of undesirable cracking and polymerization reactions. The olefins are passed over HF-treated alumina at a temperature within the range of from about 500° F. to about 950° F. We have found that when operating in this temperature range for the conversion of straight chain pentenes, space velocities should be held within the range of from about 5 to 80 volumes of the liquid olefin per volume of gross catalyst space per hour to produce equilibrium mixtures of isomerized olefins in order to avoid the concomitant production of more than 10 mole per cent of cracked products plus polymers. These space velocities correspond to contact times of approximately 1.90 seconds and 0.075 seconds respectively. When isomerizing straight chain hexenes the space velocity for a given temperature should be somewhat higher than is used for isomerizing straight chain pentenes. Thus, when isomerizing straight chain hexenes at temperatures within the range of from about 850° F. to 925° F. space velocities within the range of from about 40 to about 160 are suitable. When operating in this temperature range for the isomerization of 1- and 2-butenes to obtain equilibrium mixtures, space velocities within the range of from about 5 to about 70 may be used. The space velocity to obtain the equilibrium mixture is a function of the temperature and for the isomerization of 1- and 2-pentenes the relation is expressed as follows:

$$\log_{10} \text{Space Velocity} = 0.00265 t - 0.63$$

where space velocity is expressed as volumes of liquid pentenes per volume of gross catalyst space per hour, and $t$ represents the temperature of operation in degrees Fahrenheit. Thus, when operating the process to convert 1- and 2-pentenes at a temperature of 500° F. we use a space velocity of about 5. When isomerizing 1- and 2-pentenes at a temperature of 950° F. to produce maximum amounts of branched chain pentenes we use a space velocity of about 80. When isomerizing 1- and 2-pentenes we prefer to operate the process at temperatures within the range of from about 725° F. to about 875° F. and at space velocities within the range of from about 20 to about 50 volumes of liquid straight chain pentene feed per volume of gross catalyst space per hour. A highly olefinic light naphtha such as Fischer-Tropsch naphtha containing pentenes and hexenes with or without butenes associated therewith may be isomerized to produce large yields of branched chain isomers by operating our process at temperatures within the range of from about 750° F. to about 900° F. and at space velocities within the range of about 10 to 75. Our process of isomerizing relatively pure olefins or mixtures containing olefins and paraffins is operated in the vapor phase at pressures from about one-half atmosphere to about 7 atmospheres. We prefer to operate our process at pressures of from about atmospheric to about two or three atmospheres pressure.

The aforementioned modes of operation are primarily applicable to the production of large amounts of branched chain olefins from feed stocks containing considerable quantities of straight chain olefins. However, by adjusting the space velocity to higher values we can direct the reaction to produce relatively large amounts of 2-olefins from feed stocks containing relatively large amounts of 1-olefins. Thus, when operating our process to produce primarily 2-pentene, we prefer to operate at space velocities within the range of from about 20 to 250 volume of liquid pentene per volume of gross catalyst space per hour and at temperatures within the range of from about 500° to 950° F.

Any commercial grade alumina which contains less than about 0.1 per cent sodium may be treated with hydrogen fluoride to prepare a superior olefin isomerization catalyst. If the commercial alumina contains more than about 0.1 per cent sodium, it is first leached with an aqueous solution of an acid such as acetic acid or a mineral acid to lower the sodium content. The leached alumina is then dried preferably at about 212° F. The dried alumina product is activated by heating at a temperature of about 900° to 1000° F. for several hours. The activated alumina is treated with hydrogen fluoride preferably in the form of an aqueous solution of the acid to form an HF-impregnated alumina catalyst. The HF-treated alumina is again dried and reheated at a temperature of from about 900° to 1000° F. for a period of at least two hours. The fluorine content of the HF-treated catalyst, calculated as HF, should be at least 0.5 per cent and not more than 10 per cent by weight of the treated alumina product. The preferred method of treating the alumina is as follows:

The commercial grade alumina is leached with a 0.1N solution of acetic acid and dried at about 212° F. The leached alumina is then activated by heating at a temperature of 950° F. for two or three hours. The activated alumina is then added to an equal volume of about 5 per cent hydrofluoric acid solution and digested therein for a period of from 10 to 30 hours. The concentration of the hydrofluoric acid may vary from about 2 per cent to about 10 per cent depending upon the extent of impregnation desired. The solution is decanted from the hydrofluoric acid-treated alumina, and the alumina is again dried at about 212° F. and then reheated at a temperature of about 950° F. for a period of two hours. When this treatment with hydrofluoric acid solution is applied to alumina of 4 to 20 mesh size, a hydrofluoric acid-impregnated alumina containing fluorine equivalent to 3 per cent to 4 per cent of hydrogen fluoride is obtained.

We have found that "Alorco A" alumina is particularly suitable for isomerizing olefins if given the above hydrofluoric acid treatment. Synthetic alumina prepared from amalgamated alumina according to the method described by Heard in the Reissue Patent 22,196 also may be used. This alumina contains no sodium and hence it may be treated with the hydrofluoric acid solution or with hydrogen fluoride gas without previous leaching with acid. If desired, commercial alumina may be treated with hydrofluoric acid solution without previous leaching with an acid other than hydrofluoric acid. However, we prefer to leach the commercial alumina containing more than 0.1 per cent sodium with an acid such as acetic or sulfuric acid before treatment with the hydrofluoric acid.

Remarkably small amounts of carbon are deposited on this catalyst when isomerizing olefins, particularly when operating at high space velocities. Thus, the catalyst may be used for a period of 6 hours during which period the deposition of carbon on the catalyst will be less than 1.0 per cent based on the total weight of the catalyst. The catalyst may be disposed in stationary beds either as a continuous bed or in trays when used to catalyze the isomerization of olefins according to our process.

As indicated hereinabove, the leaching of commercial alumina catalyst with acids increases the activity of the alumina catalyst with respect to isomerizing olefins. A series of experiments was performed wherein 1-pentene was isomerized at 392° F., atmospheric pressure, and at feed rates corresponding to a space velocity of 2 volumes of liquid olefin feed per volume of catalyst per hour. Non-leached "Alorco A," "Alorco A" leached with acetic acid, "Alorco A" leached with hydrofluoric acid, and "Alorco A" leached with phosphoric acid were compared with respect to activity. The results obtained are given in Table I below.

Table I

| Catalyst | Leaching Acid | Per Cent Conversion To 2-Pentene |
|---|---|---|
| Alorco | None | 16.0 |
| Do | Acetic Acid | 43.5 |
| Do | ....do | 29.0 |
| Do | Phosphoric Acid | 43.5 |
| Do | ....do | 43.5 |
| Do | ....do | 45.2 |
| Do | Hydrofluoric Acid | 90.0 |
| Do | ....do | 88.5 |

The above results indicate that the hydrofluoric acid not only removes any deleterious sodium but also produces a much more active catalyst for the isomerization of olefins, particularly for the isomerization of 1-pentene. In a parallel series of experiments an HF-treated alumina prepared from amalgamated aluminum showed 90 per cent conversion of 1-pentene to 2-pentene at 392° F. Non-treated alumina prepared from amalgamated aluminum gave only 80 per cent conversion of 1-pentene to 2-pentene at 500° F. and at a space velocity of 1.0. Thus, the hydrofluoric acid-treated alumina gave essentially equilibrium between 1-pentene and 2-pentene while the untreated material gave conversion short of equilibrium even at a higher temperature and a lower space velocity.

The results of experiments wherein 1-pentene was isomerized in the presence of hydrofluoric acid-treated Alorco A are given in Table II below. These data are representative of data obtained in isomerizing 1-pentene at temperatures within the range of from 500° F. to 934° F. and at space velocities within the range of from 5 to 71 volumes of feed, calculated as liquid, per volume of gross catalyst space per hour.

Table II

| Temp. °F. | Sp. Vel. | Mole percent $C_5^=$ Recovered | Distribution of $C_5^=$ Per 100 Moles $C_5^=$ in Product | | |
|---|---|---|---|---|---|
| | | | 1-Pentene | 2-Pentene | Branched Pentene |
| 500 | 5 | 93.0 | 8.8 | 73.4 | 17.8 |
| 700 | 18 | 90.3 | 11.0 | 42.0 | 47.0 |
| 800 | 32 | 90.0 | 12.0 | 28.0 | 60.0 |
| 934 | 71 | 94.1 | 9.9 | 38.7 | 51.4 |

The data in Table II indicate that it is possible to isomerize the pentenes at relatively high temperatures to obtain a high percentage of branched pentenes in the product without excessive cracking if high space velocities are used. Thus, the mole per cent of branched pentenes based on the pentene content of the product is only 17.8% at 500° F. while the amount of branched pentenes in the product when operating at 800° F. is 60 per cent. The 1-pentene content of the product also increases and the 2-pentene decreases. At the higher temperatures the above results are in approximate agreement with calculated equilibrium values. Thus, within experimental error, the mixtures obtained correspond to equilibrium mixtures.

The character of the present invention and the type of results obtainable by its use are evident from the preceding specification and examples given. The examples are to be considered as illustrative and not as limitations upon the invention as defined in the appended claims.

We claim:
1. A process for converting straight chain olefins containing not more than six carbon atoms per molecule to branched chain olefins which comprises contacting at isomerization temperatures said straight chain olefins with a catalytic material consisting essentially of alumina catalyst impregnated with hydrofluoric acid, said catalyst containing fluorine equivalent to from about 0.5 per cent to about 10 per cent of hydrogen fluoride based on the total weight of the hydrofluoric acid-impregnated alumina.

2. A process for converting 1-olefins containing not more than six carbon atoms per molecule to a mixture of 2-olefins and branched chain olefins which comprises subjecting said 1-olefins to a temperature within the range of 500° F. to 950° F. in the presence of a catalytic material consisting essentially of an alumina catalyst impregnated with hydrofluoric acid, said catalyst containing fluorine equivalent to from about 0.5 per cent to about 10 per cent of hydrogen fluoride based on the total weight of the hydrofluoric acid-impregnated alumina.

3. A process for converting straight chain pentenes to branched pentenes which comprises contacting said straight chain pentenes at a temperature in the approximate range of 500° F. to 950° F. with a catalytic material consisting essentially of an alumina catalyst impregnated with hydrofluoric acid, said catalyst containing fluorine equivalent to from about 0.5 per cent to about 10 per cent of hydrogen fluoride based on the total weight of the hydrofluoric acid-impregnated alumina.

ALEX G. OBLAD.
JOSEPH U. MESSENGER.

REFERENCES CITED

The following references are of record in the file of this patent:

UNITED STATES PATENTS

| Number | Name | Date |
|---|---|---|
| 2,194,186 | Pier et al. | Mar. 19, 1940 |
| 2,353,552 | Drennan | July 11, 1944 |
| 2,388,510 | Voge | Nov. 6, 1945 |
| 2,397,085 | Doedeker et al. | Mar. 26, 1946 |
| 2,406,869 | Upham | Sept. 3, 1946 |

FOREIGN PATENTS

| Number | Country | Date |
|---|---|---|
| 534,151 | Great Britain | Feb. 28, 1941 |